3,055,671
FAST ACTION INDEX FIXTURE
Jay L. Lewis, 519½ Bayview Drive, Manhattan Beach, Calif., and Preston D. Rowan, 1616 Sycamore St., El Segundo, Calif.
Filed Aug. 14, 1961, Ser. No. 131,179
15 Claims. (Cl. 279—51)

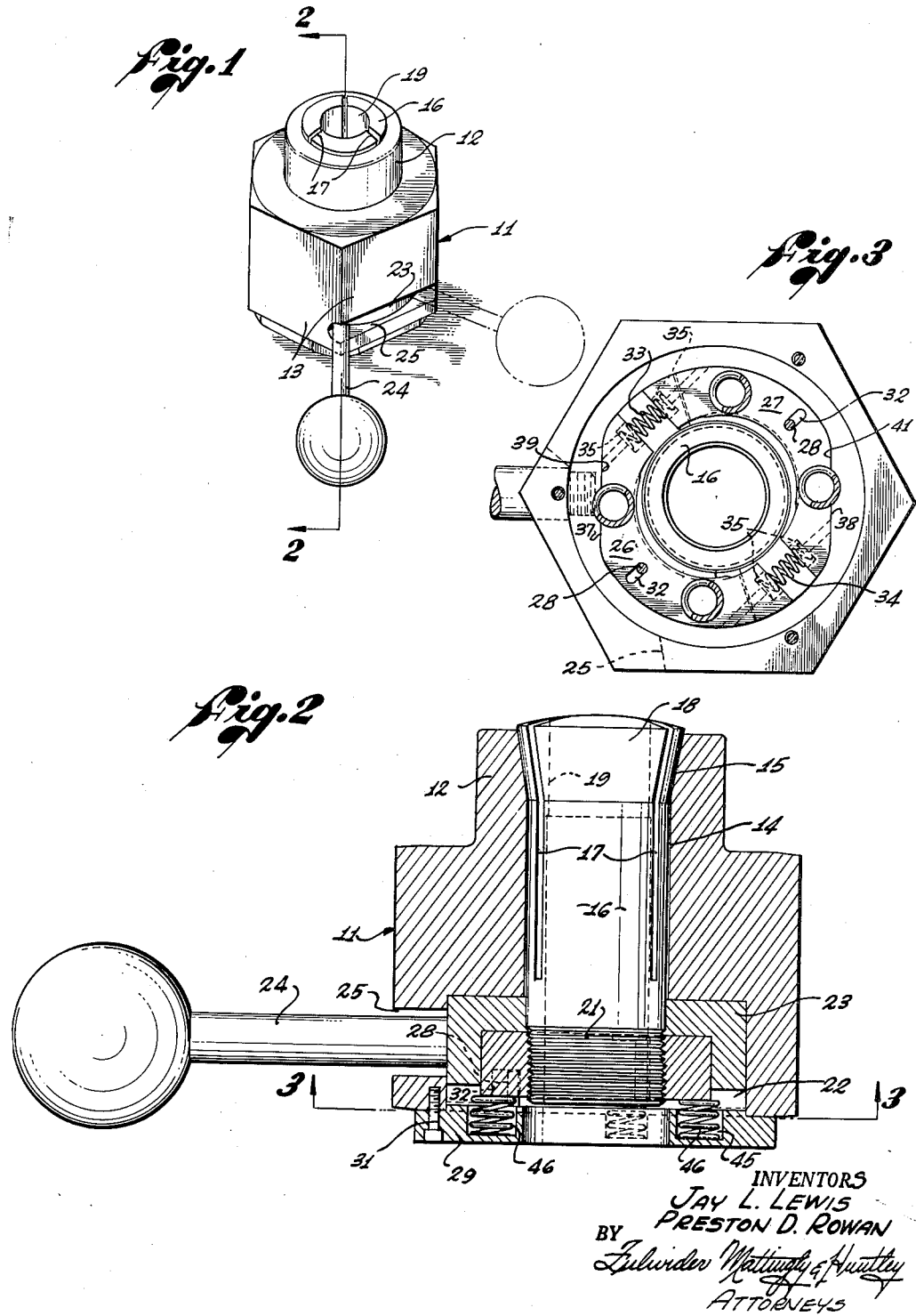

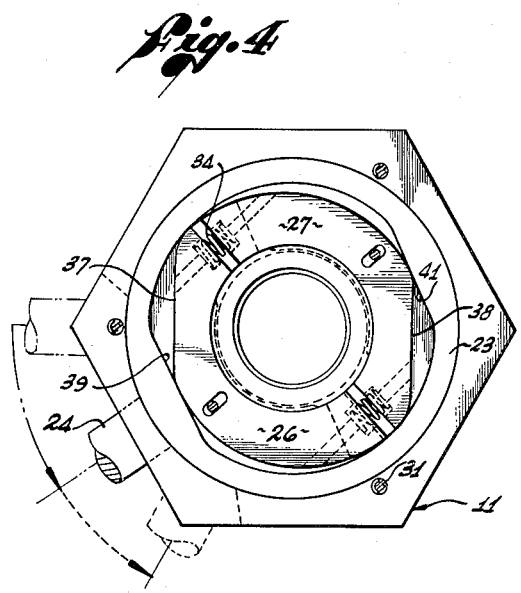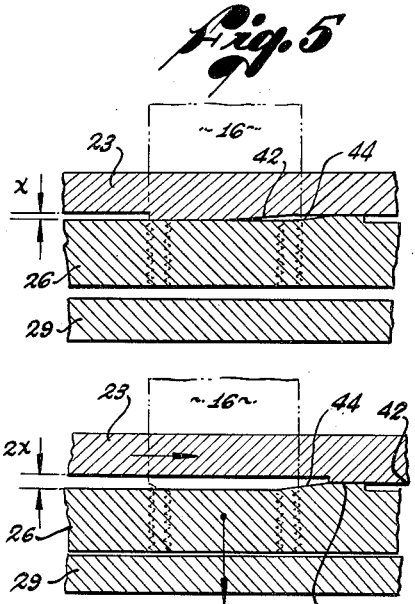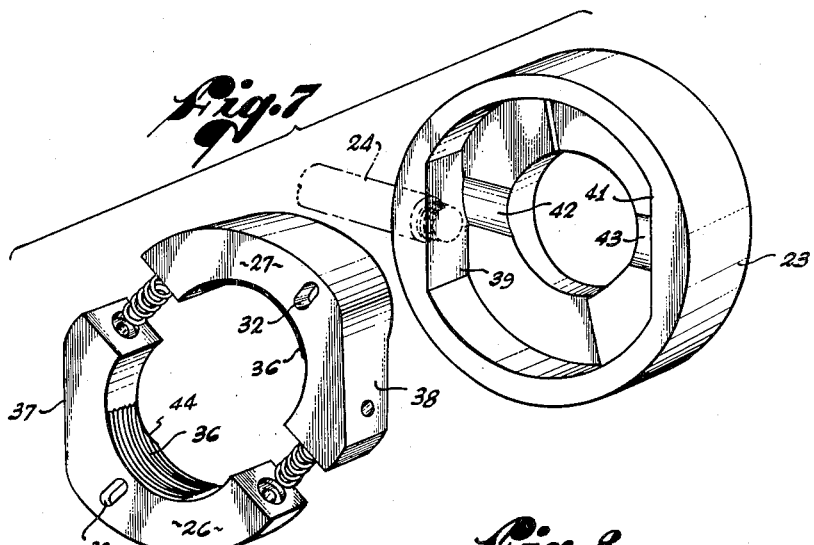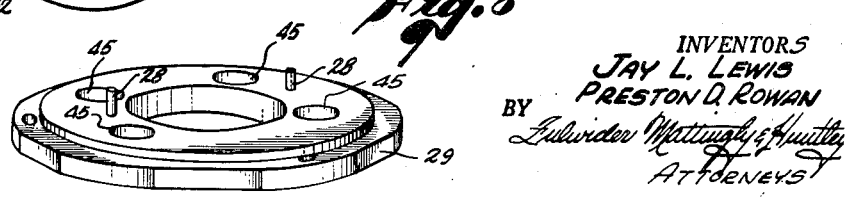

The present invention relates generally to a fixture for holding a work piece or tool, and more particularly to fast acting work or tool holders of the collet chuck type.

In the performance of machining operations such as milling, boring, turning, etc., it is desired to hold a work piece or tool securely in position during the operation or operations, and to provide for the fast engagement and release of the work piece from the holding fixture. Where a collet engaging the work piece or tool is employed in a chuck fixture, it is also desirable for the collet to be quickly and easily released from the chuck, preferably without additional manipulation. In addition to the above, it is sometimes desired for the holding fixture to index the work piece in progressive positions to effect successive operations in predetermined relationship.

With the foregoing in mind, it is an object of the present invention to provide an improved fixture for holding a work piece or tool.

Another object of this invention is the provision of an improved work holding fixture effecting quick engagement and release of the work.

Another object of this invention is the provision of an improved work holder for securely holding a work piece in a plurality of predeterminedly related positions for successive operations thereon.

A further object of this invention is the provision of an improved collet chuck for holding a work piece or tool in which the collet is clamped between radially moving members and is thereafter moved longitudinally to tighten the collet and clamp the work piece therein.

A still further object of this invention is the provision of an improved collet chuck in which the collet is engaged and moved longitudinally to clamp the work by a single, short, rotary motion of an operating member, with the collet thereby securely locked in work holding position.

These and other objects and features of the invention will be readily apparent to those skilled in the art from the following specification and the appended drawings, in which:

FIGURE 1 is a perspective view of a collet chuck, index fixture according to the present invention;

FIGURE 2 is a longitudinal sectional view through the chuck of FIGURE 1 on the line 2—2 thereof;

FIGURE 3 is a transverse sectional view on the line 2—2 of FIGURE 2;

FIGURE 4 is a view similar to FIGURE 3 but with the chuck in an intermediate operated position;

FIGURES 5 and 6 are sectional views in which the cooperating rotary cam surfaces have been developed into planar form to show their cooperation to effect longitudinal movement of the collet;

FIGURE 7 is an exploded perspective view of the two movable portions of the fixture which engage and shift the collet; and FIGURE 8 is a perspective view of the closing plate for the device.

In the form selected for specific illustration and description, the fixture or chuck according to the present invention comprises a main body 11 having an integral boss 12 extending forwardly therefrom. The body 11 is provided with external indexing surfaces, as at 13, which are arranged in predetermined angular relation with respect to each other and which serve to index a work piece held within the fixture in positions having predetermined relationships for successive work operations. A bore 14 extends through the body 11 and boss 12 and is provided at its forward end with a frusto-conical taper 15.

A removable collet 16 is disposed in the bore 14 and has a plurality of slots 17 in the end thereof extending rearwardly from the forward end, and spaced circumferentially about the collet. The collet 16 is generally tubular in form but has a frusto-conically tapered outer surface 18 adjacent to its forward end which cooperates with the taper 15 at the end of the bore 14. The collet contains an inner work or tool engaging cylindrical surface 19. A plurality of concentric grooves and ridges, resembling threads of 0 pitch, are provided at 21 about the rear portion of the collet 16.

The body 11 of the fixture has a rear counterbore 22 receiving an inverted, generally cup-shaped member 23 rotatably mounted therein. An operating handle 24 is removably threaded into the member 23 and extends through a slot 25 disposed transversely of the body 11 and leading from the counterbore 22 to the exterior of the body.

A pair of elements 26 and 27, movable transversely and longitudinally of the body 11, fit within the cup provided in the rotatable member 23. The elements 26 and 27 are prevented from rotating by means of pins 28 rigidly mounted on, and extending forwardly of, a back plate 29 removably secured to the back face of the body 11 by studs 31. The pins 28 extend into slots 32 in the elements 26 and 27, these slots having their longitudinal axes disposed radially of the chuck body. Springs 33 and 34, having their ends received in retaining sockets 35 in the opposed faces of the elements 26 and 27, serve to bias them into their separated positions where they permit free passage of the collet 16 therebetween.

The interior surfaces of the elements 26 and 27 are provided with concentric, arcuate grooves and ridges at 36, complementary to the grooves and ridges 21 on the collet 16 and engageable therewith in locking relation when the elements 26 and 27 move together. In this operation the elements 26 and 27 function somewhat in the nature of a split nut which freely passes the collet 16 when expanded but which engages it in locking relation when the split halves are moved toward each other.

The elements 26 and 27 are provided with peripheral flat surfaces at 37 and 38 which nest against the flat surfaces 39 and 41 on the interior surface of the cupshaped member 23 in the expanded positions of the elements 26 and 27. However, as the member 23 is rotated, the flat surfaces 39 and 41 thereon engage the edges between the flat surfaces 37 and 38 and the arcuate peripheral surfaces on the elements 26 and 27 to move these elements radially into the collet engaging positions of FIGURE 4. In these positions the elements 26 and 27 are supported against radial movement by the interior circumferential surface on the member 23 at the opposite ends of the elements and at the edges aforesaid.

The bottom of the cupshaped member 23 is provided with cam surfaces at 42 and 43 which cooperate with complementary cam surfaces on the forward faces of the elements 26 and 27. The cam surface on the element 26 is shown at 44 in the developed views of FIGURES 5 and 6, cooperating with the cam surface 42 on the member 23, and it will be understood that a second and similar cam surface will be provided, diametrically opposite thereto, on the forward face of the element 27 which will cooperate with the cam surface 43 on the member 23.

The forwardly directed face of the back plate 29 is provided with four equally spaced sockets 45 within which are received springs 46 whose forward ends bear against the elements 26 and 27 to bias them into their forward positions.

The operation of the fixture or chuck according to the present invention will be apparent from the relation of the parts previously described. A work piece or tool is inserted in the collet 16 which in turn is inserted into the bore 14 and through the separated elements 26 and 27, the handle 24 then being in the position shown in full lines in FIGURES 1 and 3 and in the upper dotted line position of FIGURE 4. The tapered surface 18 on the outside of the collet 16 will just contact the complementary tapered surface 15 at the forward end of the bore 14, with the collet expanded into its normal position. The handle 24 is then rotated counterclockwise, as viewed in FIGURE 5.

During the initial portion of this rotation, the flats 39 and 41 on the inner circumferential surface of the cup-shaped member 23 will engage the edges of the periphery of the elements 26 and 27 between the flats 37 and 38 and the arcuate surfaces thereon and cause the elements to move toward each other. In this movement the grooves and ridges 36 on the elements 26 and 27 interengage with the grooves and ridges 21 on the collet 16 to securely lock the elements 26 and 27 to the collet in a longitudinal direction. These positions are shown in FIGURE 4, with the handle in full lines. The cam surfaces 42 and 44 on the member 33 and the element 26, respectively, are then in the position shown in FIGURE 5, with the elements 26 and 27 still in their forward positions. The cam surface 43 on the member 23 will be in a similar relation to its cooperating cam surface on the element 27.

Continued rotation of the handle 24 into the lower dotted line position of FIGURE 4 will cause the cam surface 42 to ride up the cam surface 44 into the position of FIGURE 6, thereby moving the element 26 axially a distance equal to the combined thickness of the cams represented by the surfaces 42 and 44. These thicknesses have been represented as the same, and a dimension "x" in FIGURE 5, so that the element 26 is moved a similar distance x to a position "2x" of FIGURE 6. The element 27 will be given a similar axial movement by the cam surface 43 and the complementary cam surface on the element 27. This axial movement of the elements 26 and 27 causes axial movement of the collet 16, since they are locked together through the grooves and ridges 21 and 36, and the tapered end surface 18 of the collet will move axially of the taper 15 in the bore 14. This causes the end of the collet 16 to be compressed radially into strong clamping relation with the work piece or tool held within the collet, this radial movement being permitted by the slots 17 in the end of the collet.

It will be noted that with the parts thus clamped together, the member 23 and the elements 26 and 27 engage at flat portions, as at 50 in FIGURE 6, so that the force exerted on the member 23 through the collet 16 is axial only and has no rotational component, so that there are no forces tending to release the fixture. With the chuck so locked with the work piece therein, the handle 24 may be removed from the member 23 by unthreading it therefrom, so as to lessen the chance of involuntary release of the chuck.

To thereafter release a work piece or tool from the chuck when the machining operation has been completed, the handle 24 may be reinserted in the member 23 and rotated in a clockwise direction as viewed in FIGURE 4, whereupon the actions previously described take place in reverse; that is, the elements 26 and 27 first move axially forward to move the collet 16 therewith and release the work piece from the collet, and then the elements 26 and 27 move axially away from each other to release the collet 16 from the chuck proper.

If desired, the release movement may be stopped in the full line position of FIGURE 4 and the work piece removed without releasing the collet from the chuck. Thereafter a new work piece can be inserted into the collet and clamped therein by retracting it axially as before. In this manner of operation the collet becomes in effect a part of the chuck. Alternatively, the release movement can be completed to the position of FIGURE 3 and the collet removed from the chuck with the work piece.

The chuck or fixture of this invention may be mounted in a machine tool in any desired manner; for example, the body 11 may be received within a complementary socket in the machine tool, the body 11 may be clamped against a face of the machine tool by engagement with one of the faces 13, or the chuck may be clamped on a machine tool face by straps extending across the front of the body. It will further be seen that when a surface 13 is related to a surface on a machine tool to perform a machining operation on a work piece, movement of the chuck to present a different body surface 13 to the machine tool surface will index the work piece with the machine tool in a predetermined angular relation to the previously machined surface thereon.

While a certain perffered embodiment of the invention has been specifically shown and described, it will be understood that the invention is not limited thereto, as many variations will be apparent to those skilled in the art, and the invention is to be given its broadest interpretation within the terms of the following claims.

We claim:

1. A holding fixture comprising: a body portion having a bore therethrough; a camming surface on said bore adjacent the forward end thereof; a clamping element disposed in said bore and movable axially thereof; a camming surface on said element cooperating with said bore camming surface to effect radial clamping movement of said element as an incident to axial movement thereof; means in said body portion for releasably engaging said element; and means for axially moving said engaging means to move said element axially and effect radial clamping movement thereof.

2. A holding fixture comprising: a body portion having a bore therethrough; a camming surface on said bore adjacent the forward end thereof; a clamping element disposed in said bore and movable axially thereof; a camming surface on said element cooperating with said bore camming surface to effect radial clamping movement of said element as an incident to axial movement thereof; means in said body portion for releasably engaging said elements; means for axially moving said engaging means to move said element axially and effect radial clamping movement thereof; and a single operating means for effecting engagement and disengagement of said engaging means and axial movement thereof.

3. A holding fixture comprising: a body portion having a bore therethrough; a camming surface on said bore adjacent the forward end thereof; a clamping element disposed in said bore and movable axially thereof; a camming surface on said element cooperating with said bore camming surface to effect radial clamping movement of said element as an incident to axial movement thereof; means in said body portion for releasably engaging said elements; means for axially moving said engaging means to move said element axially and effect radial clamping movement thereof; and a single operating means for effecting engagement and disengagement of said engaging means and axial movement thereof, said operating means effecting said engagement and axial movement in succession and in the order stated.

4. A holding fixture comprising: a body portion having a bore therethrough; a camming surface on said bore adjacent the forward end thereof; a clamping element disposed in said bore and movable axially thereof; a camming surface on said element cooperating with said bore camming surface to effect radial clamping movement of said element as an incident to axial movement thereof; means in said body portion for releasably engaging said elements; means for axially moving said engaging means to move said element axially and effect radial clamping movement thereof; and a single operating means for effecting engagement and disengagement of said engaging means and axial movement thereof, said operating means effecting said engagement and axial movement in succession and in the order stated and providing for the release of work clamped within said element, without releasing the engaging means for the element, by interrupting the releasing movement of said operating means after return axial movement of the element.

5. A holding fixture comprising: a body portion having a bore therethrough; a camming surface on said bore adjacent the forward end thereof; a clamping element disposed in said bore and movable axially thereof; a camming surface on said element cooperating with said bore camming surface to effect radial clamping movement of said element as an incident to axial movement thereof; means in said body portion for releasably engaging said elements; means for axially moving said engaging means to move said element axially and effect radial clamping movement thereof; and planar surfaces on the outside of said body portion having predetermined angular relations to each other for indexing a work piece clamped within said clamping element in predeterminedly related positions for successive operations thereon.

6. A holding fixture comprising: a body portion having a bore therethrough; a camming surface on said bore adjacent to the forward end thereof; a counterbore at the rear of said body portion; a rotatable member within said counterbore; a pair of radially and axially movable elements within said counterbore; and cooperating means on said elements and member for effecting said radial and axial movements of said elements in succession.

7. A holding fixture comprising: a body portion having a bore therethrough; a camming surface on said bore adjacent to the forward end thereof; a counterbore at the rear of said body portion; a rotatable member within said counterbore; a pair of radially and axially movable elements within said counterbore; cooperating means on said elements and member for effecting said radial and axial movements of said elements in succession; and planar surfaces on the outside of said body portion having predetermined angular relations to each other for indexing a work piece clamped within said clamping element in predeterminedly related positions for successive operations thereon.

8. A holding fixture comprising: a body portion having a bore therethrough; a camming surface on said bore adjacent to the forward end thereof; a counterbore at the rear of said body portion; a rotatable member within said counterbore; a pair of radially and axially movable elements within said counterbore; cooperating means on said elements and member for effecting said radial and axial movements of said elements in succession; and means for closing said counterbore to hold said elements and member therein, said closing means including means at the back face thereof engaging said elements to prevent rotation thereof with said rotatable member.

9. A holding fixture comprising: a body portion having a bore therethrough; a camming surface on said bore adjacent to the forward end thereof; a counterbore at the rear of said body portion; a rotatable member within said counterbore; a pair of radially and axially movable elements within said counterbore; and cooperating means on said elements and member for effecting said radial and axial movements of said elements, said cooperating means including radially directed cooperating cam surfaces on said elements and member for effecting axial movement of said elements into clamping position upon rotation of said member.

10. A holding fixture comprising: a body portion having a bore therethrough; a camming surface on said bore adjacent to the forward end thereof; a counterbore at the rear of said body portion; a rotatable member within said counterbore; a pair of radially and axially movable elements within said counterbore; and cooperating means on said elements and member for effecting said radial and axial movements of said elements, said cooperating means including radially directed cooperating cam surfaces on said elements and member for effecting axial movement of said elements into clamping position upon rotation of said member and axially facing cam surfaces on said elements and member cooperating upon rotation of said member to effect axial movement of said elements.

11. A holding fixture comprising: a body portion having a bore therethrough; a camming surface on said bore adjacent to the forward end thereof; a counterbore at the rear of said body portion; a rotatable member within said counterbore; a pair of radially and axially movable elements within said counterbore; and cooperating means on said elements and member for effecting said radial and axial movements of said elements, said cooperating means including radially directed cooperating cam surfaces on said elements and member for effecting axial movement of said elements into clamping position upon rotation of said member and axially facing cam surfaces on said elements and member cooperating upon rotation of said member to effect axial movement of said elements, said radially directed and axially facing cam surfaces being circumferentially offset so that the radial and axial movements of said elements will occur in succession in response to continued rotation of said member.

12. A holding fixture comprising: a body portion having a bore therethrough; a camming surface on said bore adjacent to the forward end thereof; a counterbore at the rear of said body portion; a substantially cup-shaped rotatable member within said counterbore; a pair of radially and axially movable elements within the cup in said rotatable member; means engaging said elements to prevent rotation thereof; cooperating cam surfaces on the periphery of said elements and on the inner circumference of said member for effecting radial movement of said elements upon rotation of said member; and cooperating cam surfaces on the bottom of said cup and on the forward face of said elements for effecting axial movement of said elements.

13. A holding fixture comprising: a body portion having a bore therethrough; a camming surface on said bore adjacent to the forward end thereof; a counterbore at the rear of said body portion; a substantially cup-shaped rotatable member within said counterbore; a pair of radially and axially movable elements within the cup in said rotatable member; means engaging said elements to prevent rotation thereof; cooperating cam surfaces on the periphery of said elements and on the inner circumference of said member for effecting radial movement of said elements upon rotation of said member; and cooperating cam surfaces on the bottom of said cup and on the forward face of said elements for effecting axial movement of said elements, said axially and radially operating cam surfaces being offset circumferentially to effect said radial and axial movements in succession upon continuous rotation of said member.

14. A holding fixture comprising: a body portion having a bore therethrough; a camming surface on said bore adjacent to the forward end thereof; a counterbore at the rear of said body portion; a substantially cup-shaped rotatable member within said counterbore; a pair of radially and axially movable elements within said rotatable member; means engaging said elements to prevent rotation thereof; cooperating cam surfaces on the periphery of said elements and on the inner circumference of said member for effecting radial movement of said elements upon rotation of said member; cooperating cam surfaces on the bottom of said cup and on the forward face of said elements for effecting axial movement of said elements, said axially and radially operating cam surfaces being offset circumferentially to effect said radial and axial movements in succession upon continuous rotation of said member; and planar surfaces on the outside of said body portion having predetermined angular relations to each other for indexing a work piece clamped within said clamping element in predeterminedly related positions for successive operations thereon.

15. A collet chuck comprising: a body portion having a bore therethrough; a camming surface on said bore adjacent to the forward end thereof; a chamber in said body portion substantially concentric with said bore; a collet disposed in said bore and having its rear end extending into said chamber, the forward end of said collet having slots therein and being provided with a camming surface cooperating with the camming surface on said bore; a rotatable member in said chamber; a pair of radially and axially movable elements within said chamber at opposite sides of said collet and axially movable upon rotation of said rotatable member to interlock with the interior end of said collet; and cooperating means between said elements and member for effecting axial movement of said elements to move the collet axially and effect clamping movement of the forward end thereof by the cooperation of said camming surfaces.

References Cited in the file of this patent

UNITED STATES PATENTS

| | | |
|---|---|---|
| 2,434,600 | Swenson | Jan. 13, 1948 |
| 2,450,931 | Bault | Oct. 12, 1948 |
| 2,735,688 | Duchesneau | Feb. 21, 1956 |
| 2,849,240 | Sorensen | Aug. 26, 1958 |